United States Patent

[11] 3,616,286

| [72] | Inventors | John A. Aylward<br>Vernon, Conn.;<br>Lawrence J. Bregoli, Westfield, Mass. |
|---|---|---|
| [21] | Appl. No. | 862,151 |
| [22] | Filed | Sept. 15, 1969 |
| [45] | Patented | Oct. 26, 1971 |
| [73] | Assignee | United Aircraft Corporation<br>East Hartford, Conn. |

[54] AUTOMATIC PROCESS AND APPARATUS FOR UNIFORM ELECTROPLATING WITHIN POROUS STRUCTURES
9 Claims, 4 Drawing Figs.

[52] U.S. Cl. ................................... 204/24,
204/228, 204/275
[51] Int. Cl. ..................................... C23b 5/48,
B01k 3/00
[50] Field of Search.......................... 204/24,
228, 229, 275, 276

[56] References Cited
UNITED STATES PATENTS
2,260,893 10/1941 Ewing............................ 204/275

| 2,474,502 | 6/1949 | Suchy............................ | 204/20 |
|---|---|---|---|
| 2,694,743 | 11/1954 | Ruskin et al................. | 204/20 |
| 3,067,123 | 12/1962 | Huber........................... | 204/228 |
| 3,287,169 | 11/1966 | Rogers.......................... | 204/11 |
| 3,407,125 | 10/1968 | Fehlner......................... | 204/20 |

FOREIGN PATENTS
| 742,201 | 9/1966 | Canada |
|---|---|---|
| 6,709,661 | 7/1967 | Netherlands |

*Primary Examiner*—Howard S. Williams
*Assistant Examiner*—T. Tufariello
*Attorney*—Edmund C. Meisinger ABSTRACT: An automatic process for uniformly electroplating the internal surfaces of conducting porous structures. The method is particularly suitable for the electrodeposition of a catalytic material within a fuel cell electrode. A potential pulse travels through the porous structure upon the initial application of a plating potential to the structure causing local depletion of the ions in solution within the pores of the structure. Exhaustion of ions is sensed causing cessation of the applied potential while scheduling a flow of fresh plating solution through the electrode. Replenishment of ions triggers a new plating cycle.

INVENTORS
JOHN R. AYLWARD
LAWRENCE J. BREGOLI

BY Edmund C. Meisinger
ATTORNEY

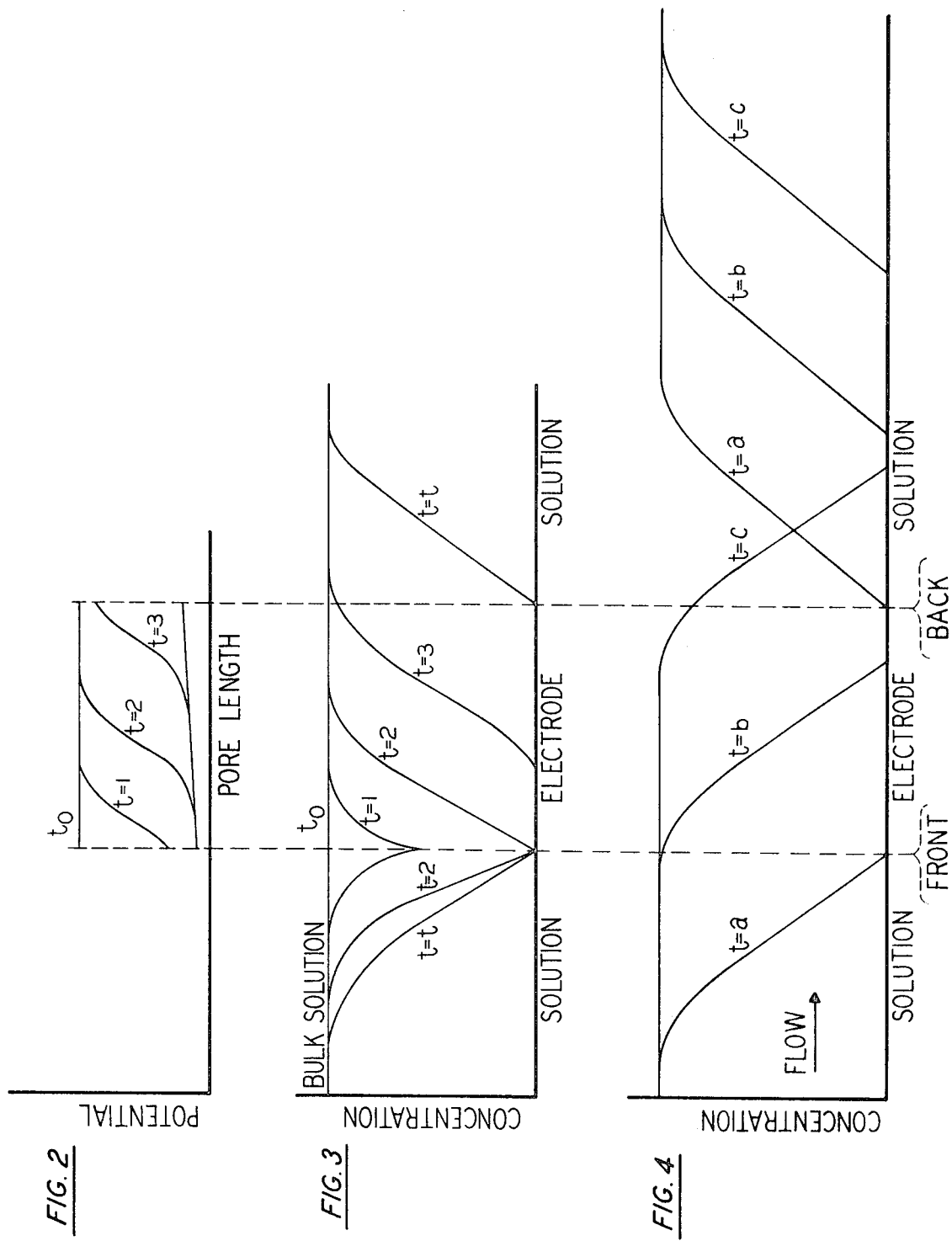

AUTOMATIC PROCESS AND APPARATUS FOR UNIFORM ELECTROPLATING WITHIN POROUS STRUCTURES

BACKGROUND OF THE INVENTION

This invention relates to uniform electroplating within porous structures and more specifically relates to plating of catalysts uniformly throughout porous electrode substrates.

A fuel cell is an electrochemical device in which the free energy of combustion of the fuel is converted directly into electrical energy. A simple cell comprises a housing, a fuel electrode, an oxidizing electrode and an electrolyte separating the electrodes. An external circuit is provided for drawing off the electrical current.

Fuel cell electrodes are made with a porous structure, and the electrochemical reaction generally occurs within the pores of the electrode rather than at the outer surfaces. Ordinarily, a three-phase interface exists within each electrode, i.e., reactant gas, liquid electrolyte and solid electrode substrate. As a practical matter, the three-phase interface is free to move within the electrode. The interface location is controlled by a variety of factors, the most common of which are the pressure differential across the electrode, the surface tension of the electrolyte and the volume of the electrolyte.

In the high operating temperature fuel cells, the electrochemical reactions proceed at a satisfactory rate. In the lower operating temperature fuel cells, it is desirable to dispose a catalytic material on the electrodes in order to provide a satisfactory rate of reaction of the fuel gas and the oxidant gas. Rather than construct the entire electrode from the catalyst itself, which is ordinarily an expensive material, it is advantageous to employ a low-cost inert conducting material with the proper structure and deposit a smaller amount of catalyst on the electrode. Since the three-phase interface is free to travel to some extent from one surface to the other surface within the electrode, it is desirable to disperse the catalyst uniformly throughout the electrode.

There are a number of ways of depositing a catalyst within the pores of a substrate, and each has its advantages and limitations. Catalysts in solution have been drawn through an electrode substrate to filter the catalyst onto the substrate material. This procedure is not wholly acceptable because the catalyst is not uniformly dispersed, and often a sealant is required to retain the catalyst within the porous electrode. The sealant cover up much of the catalyst. In screen electrodes, a catalyst-polymer mixture is sprayed onto a foil and a screen substrate is pressed into the mixture. The unit is sintered and the foil is removed, producing a screen electrode having a mixture of polymer and catalyst. This is a waterproofed porous structure, but much of the catalyst is covered resulting in use of only a small portion of the catalytic material. Replacement plating, in which the catalyst is deposited at the expense of substrate dissolution, can be used in a limited number of cases. For this method, the substrate must be less noble than the catalyst. This method is simple when it can be used, but the catalytic properties of the deposit are difficult to control and the deposit is seldom adherent. Further, it is difficult to replacement plate two catalysts if a combination is desired. Generally, replacement plating is not acceptable since the catalyst tends to plate out on the outer surface of the electrode. Another method is to saturate the substrate with a salt solution of the metal to be deposited, evaporate the solution and then decompose or reduce the salt to the metal. The high temperatures generally required for the reduction to the metal may be detrimental to the catalytic activity, and the evaporation step can lead to nonuniform catalyst distribution. Also, the decomposition products of the reduction are often corrosive to the substrate.

Electroplating could be employed for applying catalytic material to porous electrode structures. Conventional electroplating, however, would produce a deposit predominantly on the external surface of the electrode structure instead of uniformly within the pores.

SUMMARY OF THE INVENTION

An object of this invention is the provision of a novel method and apparatus for electroplating materials uniformly within a porous structure.

Another object of this invention is the provision of a process whereby catalytic materials may be electroplated uniformly throughout a porous electrode structure. An important aspect of this process lies in the fact that the process is not limited to use with sinter electrodes.

A further object of this invention is to provide a method of uniformly depositing small quantities of noble metal catalysts on conducting supports in a repeatable fashion suitable for production of electrodes in quantity. A feature of this invention concerns its ability to permit activation of an inert electrode structure after fabrication thereby facilitating the use of electrode fabricating techniques which would normally be detrimental to the catalyst structure.

In accordance with the invention, a potential is applied to the porous electrode structure causing a plating pulse to travel through the structure causing local depletion of ions in a plating solution within the pores. A system was devised to switch off the plating potential immediately after the pulse has passed through the electrode (i.e., essentially when plating within the pores ceases). Cessation of the current pulse causes fresh plating solution to flow through the electrode replenishing the ions within the pores of the electrode structure. The apparatus is designed to adjust automatically to provide a uniform deposit for any conducting porous structure. To obtain a uniform deposit within the pores, it is necessary to control both the plating potential and the electrolyte concentration gradient of the depositing ions within the pores of the structure. Controlled potential pulse plating (rather than controlled current or voltage) is an important new dimension in electroplating.

DESCRIPTION OF THE DRAWINGS

FIG. 2 is a graphical presentation of the electrical potential through a pore in an electrode as a function of the time after the application of the plating potential.

FIG. 3 is a graphical presentation of the plating ion concentration through a porous electrode as a function of the time after the application of the initial plating potential.

FIG. 4 is a graphical presentation of the replenishment of the electroplating solution within the pores of the electrode structure by forced solution flow.

DESCRIPTION OF THE PREFERRED EMBODIMENT

Figure 1:
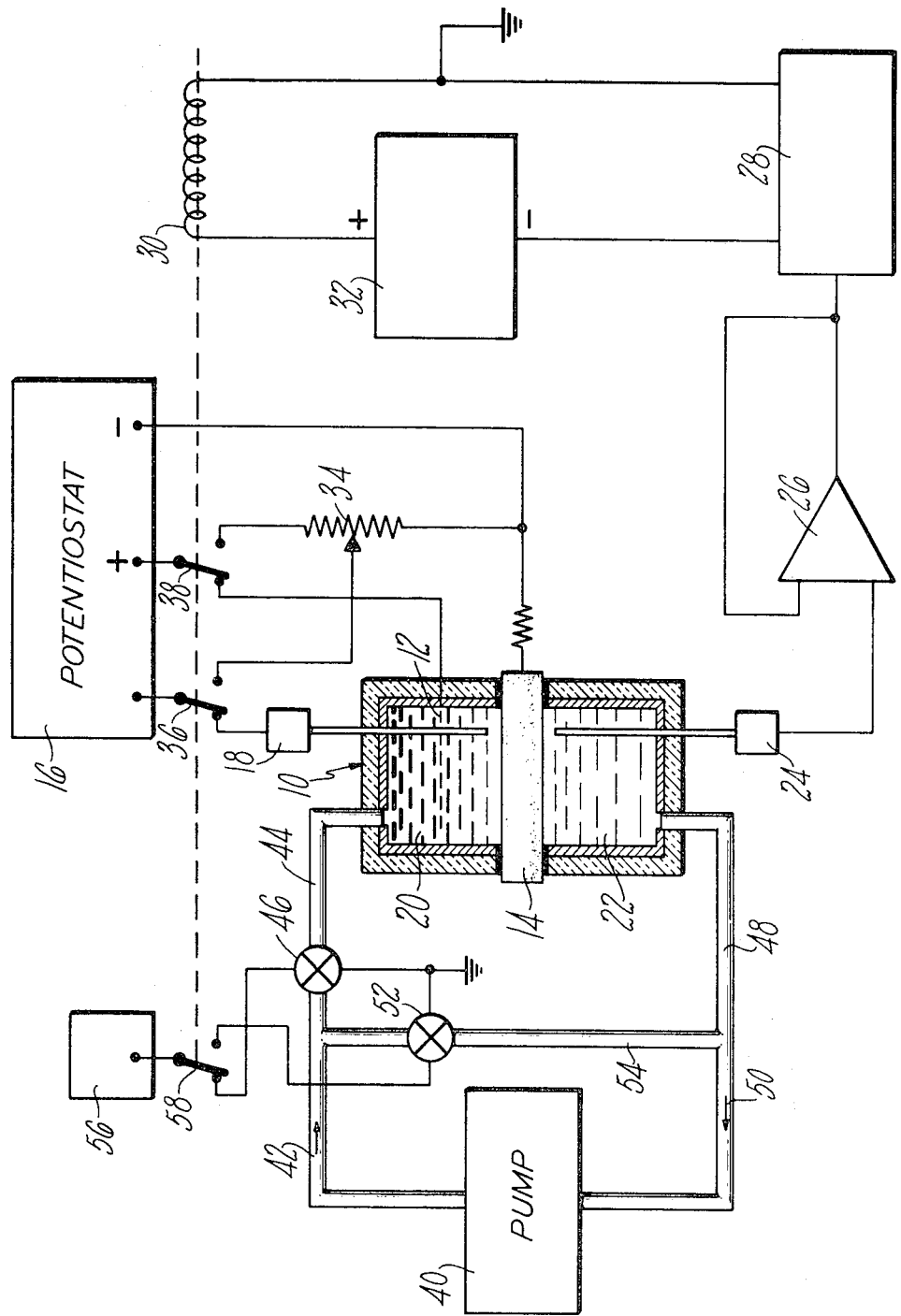
FIG. 1 is a schematic illustration of an apparatus particularly suited for electroplating within porous electrode structures.

Electroplating is the deposition of a layer of some material in solution on an object by passing an electric current through the solution in which the object has been immersed. The object to be plated is usually the cathode. The object being plated is ordinarily a metal and the thin coating deposited is ordinarily a different metal. The electroplating solution is typically an aqueous solution of a salt containing the element being deposited. The anode may or may not dissolve during the electroplating process. The thin layer being deposited is sometimes composed of two or more metallic elements in which case the deposit may be an alloy. While the structure undergoing plating usually is a good electrical conductor, it may be a nonconductor which has previously received a thin coating of some conductive material. Graphite is often used for this purpose, but other materials will serve in a manner similar to that of the graphite.

The main factors affecting the rate of electroplating and the nature of the deposit are the substrate, ion concentration, applied potential, temperature, and solution composition. Determining the solution composition and operating temperatures for a substrate are within the state of the art. Regulating potential and ion concentration is a relatively simple task to accomplish with nonporous substrates. The amount of material deposited at a given point on a substrate is determined by the time relationship of the applied potential and the ion concentration. To achieve a uniform deposit over a surface it is necessary to control these parameters in such a way that the current for deposition is equal at all points.

A porous electrode presents certain complications in electroplating throughout the structure due to the complex geometry involved. First, the potential within the porous material initially varies with both time and distance. After steady-state is reached, potential varies only slightly and in a linear manner with distance due to the internal resistance. Secondly, the interior pores are relatively inaccessible to the bulk electrolyte compared to the outer surfaces so that controlling the ion concentration gradient to get uniform deposition within the porous material is impractical. After the ions are plated within the porous electrode, the continued application of potential would deposit ions only on the external surfaces of the electrode and thus uniform distribution of catalyst or plating would not be achieved.

The time required to complete the plating cycle and the electrolyte replenishment cycle depends entirely on the properties of the porous structure. A system to detect when these two processes are completed and to automatically control switching from one to the other is essential. Such a system is shown schematically in FIG. 1 as having a plating cell indicated generally as 10, an anode 12 and a structure to be plated as cathode 14. The anode 12 is connected to the positive terminal of a power supply 16 and the cathode 14 is connected to the negative terminal of the power supply. The power supply is preferably a potentiostat. The reference electrode 18 senses the potential essentially at the front surface of the porous structure and transmits a signal to the potentiostat to maintain the potential of the porous structure at any preset value. The plating cell may be separated into a first chamber 20 containing plating solution and a second chamber 22 similarly containing the plating solution. The plating cell can be separated simply by the cathode as is apparent. A second reference electrode 24 senses the potential at the back surface of the electrode and transmits a signal to a voltage follower 26 causing a voltage control relay 28 to activate the switching relay 30. The switching relay 30 is powered by a battery or similar device 32. Activation of the switching relay operates switches 36, 38, and 58 transferring power from the plating cell to a dummy load 34. This dummy load is provided simply to prevent overloading of the potentiostat during the cycling.

An electrolyte replenishment system is provided including a pump 40 which circulates electrolyte through conduits 42 and 44 past a normally open solenoid valve 46 to the electrolyte chamber 20 of the plating cell. At the same time, electrolyte is drawn from the compartment 22 through conduits 48 and 50 back to the electrolyte pump. When a plating potential is being applied to the cathode 14, the solenoid valve 46 is closed. The electrolyte pump 40 circulates electrolyte through conduit 42 past solenoid valve 52 through the bypass conduit 54 and thereafter through conduit 50 to the inlet to the pump. The switching relay 30 also transfers power from one solenoid valve to the other. Power to the solenoid valves is provided by the power supply 56 to solenoid valves 45 or 52 as directed by the relay actuated switch 58.

In operation, the normally open solenoid valves direct the flow of plating solution either through the porous electrode when the potentiostat is on the dummy load or around the bypass when plating is in progress. This arrangement is more desirable than switching the electrolyte pump on and off. When replenishment of the plating solution within the pores of the electrode is complete, the second reference electrode 24 senses a potential corresponding to the open circuit potential of the bulk plating solution; and the voltage control relay switches off power to the switching relay. The potentiostat is switched from the dummy load to plating to start a new cycle of the deposition process while the electrolyte flow is detoured through the bypass.

When the plating potential is first applied, there is no ion concentration gradient between the bulk solution and the solution within the pores of the structure. The initial current at the front surface of the electrode will be very high followed by a rapid decay as the concentration gradient builds up due to the ion depletion within the porous structure. After the potential is applied, it takes a finite time for the potential to decrease to the steady-state value. Initially a potential pulse moves through the electrode from the front surface to the back surface. When steady-state is reached, the potential at the back surface will be slightly less than at the front surface due to the electrolyte resistance through the pores. The potential of the electrode-solution interface through a pore as a function of time after the initial application of the plating potential to the front surface is illustrated graphically in FIG. 2. The actual time needed for the potential at the end of the pore to approach the applied value and the shape of the potential profile through the pore depends on the impedance of the electrode-solution interface, pore geometry and varies for each substrate configuration. As stated, the rate of deposition for the catalyst ions is determined by the potential of the electrode-solution interface and the concentration of the depositing ions within the pores. As these ions are deposited on the interior surfaces, their concentration in solution within the pores of the structure decreases. This change in concentration throughout the electrode or for a single pore as a function of the time after application of the plating potential is shown in FIG. 3. It is apparent that a concentration pulse travels through the electrode from the front surface to the back surface. After some finite time, the concentration of depositing ions within the pores is reduced to zero and deposition within the structure ceases. However, with continued application of potential, deposition at the surfaces of the structure will continue at a rate determined by the ion concentration in the bulk solution.

The combined effect of a potential pulse and a concentration pulse moving through the pores of the electrode results in a plating current pulse moving through the electrode with time. However, the current should be essentially constant as the pulse travels through the pores. The electroplating process should be stopped as soon as the current pulse has completed its travel through the electrode to avoid excess deposition of ions at the outer surfaces of the structure. It may be desirable in some cases to incorporate some time delay in the switching. Controlled potential pulse plating rather than controlled current or cell voltage electroplating is an important new dimension in uniform electroplating of metals within a porous structure.

As the potential of the porous structure is decreased from the equilibrium value, the rate of deposition increases exponentially. At more negative potentials, a limiting deposition rate independent of potential is reached in which the deposition rate is controlled entirely by the rate of mass transport of the ions to the electrode surface. As the potential is made even more negative, a point will eventually be reached where other reactions can occur, for example, hydrogen evolution. Gas bubbles within the structure would cause disruption of the concentration gradient, and further deposition in these regions would be prevented.

The nature of the deposit for a given plating solution and porous structure is determined by the potential at which the plating occurs. A high surface area deposit corresponding to a high catalyst surface for fuel cell electrodes is favored by operating at a potential corresponding to the mass transport limiting current density. In this region, the rate of nucleation compared to the rate of crystal growth is maximized. When a chemical step in the overall reaction becomes rate determining as when occurs when the ion to be deposited is complexed, deposition generally results in a low surface area plating which may be desirable in certain applications, for example, the deposition of a protection coating within a porous structure.

Virtually any metal which forms an ion in solution can be electroplated on a conductive substrate. The catalysts can be any material which will favorably influence an electrochemical reaction, such as copper, gold, nickel, silver, platinum, palladium and the like. Although the invention has been described with particular respect to porous structures which inferentially appear to be sinter electrodes, screen or lightweight electrodes may be activated using this technique. The screen electrode may be described as a conductive screen as a support for a catalyst-Teflon mixture. Teflon or another polymer is utilized for the purpose of providing a hydrophobic layer within the electrode. The catalyst structure in this electrode may be replaced by a low cost conducting substrate, i.e., carbon, and pulse plating results in coating of catalyst on the exposed substrate particles which provides a maximum utilization of the catalyst.

To date, a number of fuel cell screen electrodes have been catalyzed by the pulse plating technique described in this invention. The most promising screen electrodes have been constructed of a screen substrate having a layer of Teflon and graphite powder or gold-black. The gold-black has a surface area of approximately 10 m²/gm. The graphite is designated as American Cyanimid 99 percent graphite and has a surface area of 11.4 m.²/gm. The gold-black or graphite powders were mixed with Teflon 30 in the ratio of about 20 percent of Teflon and applied to a gold-plated stainless steel screen in the usual manner. The electrodes were then catalyzed with various amounts of platinum by the pulse-plating technique. The plating solution was a one molar sulfuric acid solution containing the amount of platinum sulfate required to provide the particular catalyst loading desired. In these cases, the plating potential employed was 0.1 volt with respect to the hydrogen reference electrode. This potential is well within the limiting current density region for platinum deposition and sufficiently positive to avoid hydrogen evolution. The performance at select current densities of some pulse-plated gold-plated stainless steel screen electrodes in a 50 percent phosphoric acid electrolyte at 70° C. is shown in table 1.

TABLE I

| Electrode number | Substrate loading | mg./cm.² | Platinum loading mg./cm.² | Performance mV at mA/cm.² | | | | | |
| --- | --- | --- | --- | --- | --- | --- | --- | --- | --- |
| | | | | H₂ anode | | | O₂ cathode | | |
| | | | | 100 | 200 | 500 | 100 | 200 | 500 |
| 2976 | Graphite | 12.8 | 3.0 | 14 | 25 | 65 | 800 | 740 | 625 |
| 2951 | ...do... | 12.2 | 3.0 | 10 | 20 | 50 | 770 | 715 | 625 |
| 2956 | ...do... | 13.6 | 3.0 | 10 | 20 | 50 | 780 | 730 | 630 |
| 2941 | Gold | 27.7 | 1.0 | 10 | 20 | 50 | 784 | 750 | 682 |
| 2953 | Graphite | 16.3 | 0.5 | 14 | 25 | 60 | 725 | 650 | 525 |
| 2952 | ...do... | 9.6 | 0.25 | 15 | 30 | 75 | 710 | 650 | 545 |

An electrode was run as an oxygen cathode against the standard platinum anode in a full fuel cell. From the test, it was apparent that pulse-plated electrodes containing less than 10 percent of the platinum contained in the conventional electrode will provide performance equivalent to pure platinum activated electrodes.

The process itself was designed to give a uniform deposit of catalyst within the pores of an electrode structure. A number of pulse-plated electrodes have been examined for platinum distribution by electron microprobe analysis. Analysis of electron back scatter for cross sections of electrodes shows a quite uniform platinum distribution throughout the electrode structure.

This pulse-plating process provides a means for uniformly depositing small quantities of expensive noble metal catalysts within porous conducting supports which cannot be exchange plated. The process is readily adaptable for the production of electrodes in quantity. The nature of the deposit can be controlled to give optimum catalytic properties by the choice of plating conditions in terms of both composition, temperature, and plating potential. The process also permits activation of inert electrode structures after fabrication, which allows the use of fabricating conditions which would normally be detrimental to the catalyst materials. Electrodes containing less than 10 percent of the normal amount of noble metal catalysts used in conventional electrodes which show comparable performance have been prepared by this technique.

Although the invention has been shown and described with respect to a preferred embodiment, it should be understood by those skilled in the art that various changes and omissions in the form and detail may be made therein without departing from the spirit and scope of the invention.

We claim:

1. The method of electroplating a catalytic material within a porous fuel cell electrode by alternately plating and replenishing plating solution comprising the steps of:
   disposing an electrically conductive porous electrode substrate in a plating cell wherein the electrode substrate divides the plating cell into two compartments each containing plating solution;
   applying a plating potential to the electrode whereby catalyst ions in the plating solution are deposited on the substrate causing a decrease in ion concentration within and traveling through the substrate;
   detecting a change in potential at the back surface of the electrode substrate and interrupting the plating potential responsive thereto; and
   causing a flow of plating solution through the electrode substrate whereby the plating solution within the pores of the electrode is replenished out of phase with the plating and responsive to the change in potential at the back surface of the electrode.

2. The method of claim 1 including:
   replenishing the plating solution by causing a flow of plating solution and catalyst ions through the porous electrode resulting in the elimination of the concentration gradient between the ion-depleted plating solution within the substrate and the concentration of the ions in the bulk plating solution.

3. The method of claim 2 including:
   comparing the potential at the back surface of the electrode with the plating potential set at the front surface of the electrode; and
   switching sequentially from plating to electrolyte replenishment responsive thereto and determining electrolyte replenishment when the plating solution in the pores of the electrolyte is complete by sensing a predetermined potential at the back surface of the electrode.

4. The method of claim 2 including:
   determining electrolyte replenishment by comparing the potential at the back surface of the electrode with open circuit potential.

5. The method of electroplating a metal uniformly throughout a porous structure by alternately plating and replenishing the plating solution within the pores of the structure which comprises the steps of:
   disposing an electrically conductive porous structure in a plating cell and dividing the plating cell into two compartments each containing the metal ions in the plating solution; 1
   applying a plating potential to the structure whereby metal ions in the plating solution are deposited on the structure causing a decrease in ion concentration within the structure and a potential pulse traveling through the structure;
   detecting the change in potential at the back surface of the structure and interrupting the plating potential applied responsive thereto; and
   causing an intermittent flow of plating solution through the structure whereby the metal ion depleted plating solution within the pores of the structure is replenished out of phase with the plating and responsive to the change in potential at the back surface structure.

6. An apparatus for automatically electroplating a metal uniformly through the pores of a structure by alternately plating and replenishing the plating solution within the pores comprising;

a plating cell having an anode, said cell adapted to contain a porous structure to be electroplated as a cathode and metal ions to be plated in the plating solution;

means for applying a plating potential between the anode and the cathode causing a potential pulse to travel through the porous structure from the front side to the back side upon the initial application of the plating potential to the structure;

means for sensing the potential at the back surface of the structure;

means for interrupting the applied potential responsive to decreased potential sensed at the backside of the structure; and means for flowing the plating solution containing metal ions to be plated through the porous structure containing ion depleted electroplating solution responsive to decreased potential sensed at the backside of the porous structure whereby the replenishment of the solution increases the potential sensed at the backside of the structure causing a cessation of the flow of plating solution and commencing another cycle of the plating process by initiating the application of another plating potential.

7. An apparatus as in claim 6 including means for sensing the applied potential at the front surface of a cathode whereby said means transmits a signal to the means for applying the plating potential to maintain the applied potential at any preset value.

8. An apparatus as in claim 7 wherein the means for flowing the plating solution through the porous structure comprises a continuously operating pump and a duct to the plating cell having normally open solenoid valve and a bypass line returning electroplating solution to the pump also having a normally open solenoid valve wherein the means for sensing the potential at the back surface of the structure transmits a signal to a switching relay, transferring power from one solenoid to another to direct the flow of plating solution either through the porous structure or around the bypass when plating is in progress.

9. An apparatus as in claim 8 wherein the means for sensing potential at the back surface of the cathode is a reference electrode which transmits a signal to a switching relay, the switching relay activating means for transferring the plating potential to a dummy load.

* * * * *